United States Patent [19]

Lewis

[11] Patent Number: 4,888,910
[45] Date of Patent: Dec. 26, 1989

[54] ADJUSTABLE SNELLED FISH HOOK ASSEMBLY

[76] Inventor: Roger C. Lewis, P.O. Box 57, Brimley, Mich. 49715

[21] Appl. No.: 131,848
[22] Filed: Dec. 11, 1987
[51] Int. Cl.$^4$ .............................................. A01K 83/06
[52] U.S. Cl. .................................... 43/44.82; 43/43.1; 43/44.85
[58] Field of Search ................ 43/44.85, 44.84, 42.74, 43/43.1, 44.83, 44.82

[56]  References Cited

U.S. PATENT DOCUMENTS

| 953,125 | 3/1910 | Desmond | 43/44.85 |
| 2,227,420 | 1/1941 | Augenblick | 43/44.85 |
| 4,107,866 | 8/1978 | Manno | 43/44.85 |
| 4,117,619 | 10/1978 | Stevenson | 43/43.1 |
| 4,361,977 | 12/1982 | Lawler | 43/43.1 |
| 4,569,148 | 2/1986 | Kemp | 43/43.1 |

FOREIGN PATENT DOCUMENTS 1390910  4/1975  United Kingdom ................ 43/43.1

Primary Examiner—Gene P. Crosby
Attorney, Agent, or Firm—Robert A. Sloman; Raymond Scott; Richard Araver

[57]  ABSTRACT

An adjustable snelled hook assembly comprises a fishing line with a trailing hook secured thereto. An auxiliary hook has a shank, a barb and an eye loosely and slidably mounted upon the fishing line adjustably spaced from the trailing hook. A coil spring is mounted upon the shank and is generally parallel to the fishing line. A plurality of continuous windings of the line extend around and snugly engage the spring and shank to anchor the auxiliary hook upon the fishing line.

6 Claims, 1 Drawing Sheet

U.S. Patent  Dec. 26, 1989  4,888,910
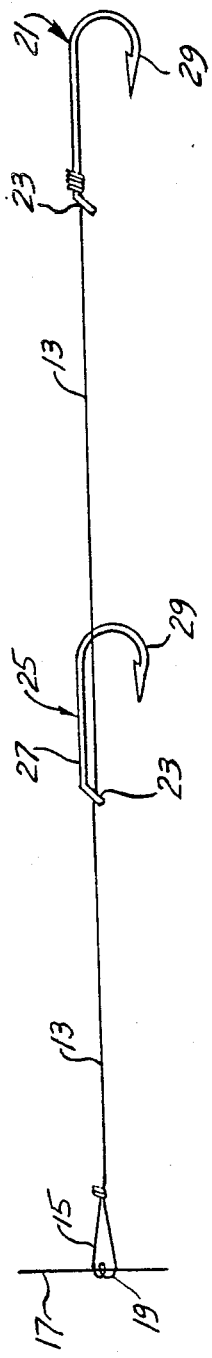
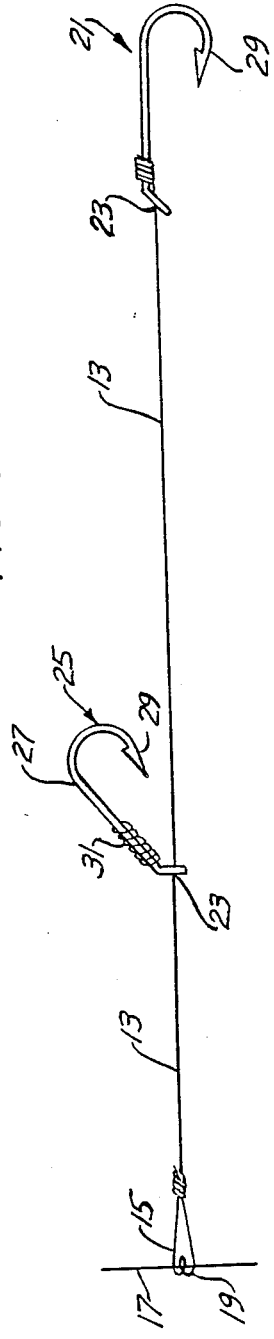
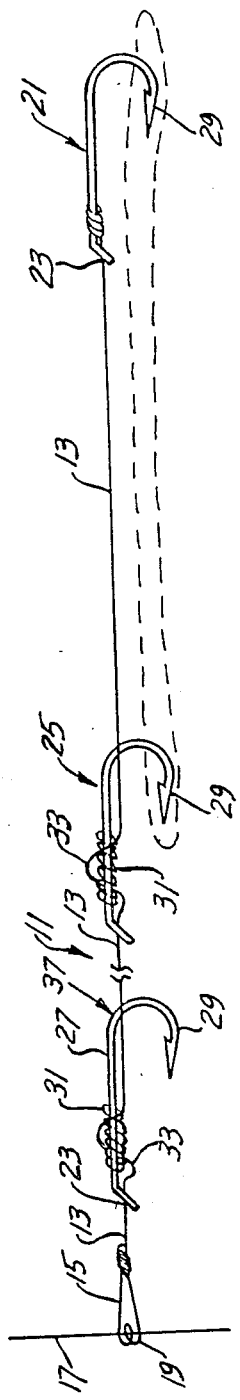

ADJUSTABLE SNELLED FISH HOOK ASSEMBLY

FIELD OF THE INVENTION

The present invention relates to adjustable mounting of a hook along a fish line and more particularly to snelled fish hook assembly using one or more adjustable hooks in conjunction with a fixed hook on the end of a line enabling the hooks to adjust along the line to fit any size bait.

BACKGROUND OF THE INVENTION

Heretofore, in the use of the fishing along a fishing line or a leader connected to a fishing line it has been difficult in adjustably mounting the hook upon the line or leader, so that its longitudinal positioning may be modified from time to time. Heretofore, on fishing lines or leaders with a hook mounted upon one end thereof, there has been the difficulty of adjustably mounting a second hook upon the fishing line or leader and in securing the same in an adjusted position so that the adjustable hook is at a predetermined adjustable distance with respect to the trailing hook so as to impale a fishing bait therebetween.

Heretofore, in fishing with live or an artificial bait with a single bait upon a fish hook attached to a line or a leader for a line, a single hook has been ineffective in catching and restraining a fish which seizes the bait and has coughed up the bait or otherwise dislodged the hook after an initial strike. It has been found in practice that the use of a pair of such hooks upon a fishing line are more effective in snaring a fish wherein the fish bait, whether it be artificial or natural, such as a worm or a minnow or the like, is extended between a pair of fish hooks and wherein one of the fish hooks is adjustably mounted upon the line in order to accommodate the length of the lure attached thereto.

THE PRIOR ART

The following prior art patents are illustrative of earlier prior art efforts in improving the efficiency of fishing lines or leaders with the use of one or a pair of hooks secured thereto.

| U.S. Pat. No. | Patent Date | Name |
| --- | --- | --- |
| 953,125 | March 29, 1910 | C. L. Desmond |
| 1,206,289 | November 28, 1916 | S. Forster |
| 2,227,420 | January 7, 1941 | J. Augenblick |
| 2,808,678 | October 8, 1957 | S. Leonardi |
| 4,107,866 | August 22, 1978 | Manno |

SUMMARY OF THE INVENTION

An important feature of the present invention is to provide an adjustable snelled hook assembly using one or more adjustable hooks in conjunction with a fixed hook on the end of a line or leader enabling the hooks to adjust to fit any size bait and to adapt to fish striking changes.

Another important feature is to provide upon a fishing line or leader having a trailing hook secured thereto an additional hook having an eye, a shank and a barb with the eye loosely received upon the line and suitably mounted thereon together with a means for fixedly securing the auxiliary hook in a predetermined spaced relation with respect to the trailing hook in order to secure therebetween a bait extending between the hooks.

Another feature is to provide upon a fishing line or leader which mounts a trailing hook secured thereto an auxiliary hook having an eye and a shank which is loosely and slidably mounted upon the fishing line or leader adapted for adjustable spacing with respect to the trailing hook in order to fit the size of a predetermined lure extending between the hooks, and wherein upon the shank of the auxiliary hook there is provided a coil spring and wherein the line or leader is wound around the spring and shank of the auxiliary hook for between 3 to 6 turns snugly engaging the spring and shank for anchoring the auxiliary hook in position upon said line or leader.

As another feature, the coil spring or other flexible spiral element is positioned upon and around the shank of the auxiliary hook and retained thereon and with the shank generally parallel and closely adjacent the fishing line or leader portions of the line or leader intermediate its ends are wound snugly around the spiral element or spring and adjacent shank for fixing the auxiliary hook upon the fishing line or leader in a predetermined spaced relationship with respect to the trailing hook thereon.

These and other features and objects will be seen from the following specification and claims in conjunction with appended drawing.

THE DRAWING

FIG. 1 is a side view of the present snelled hook showing an auxiliary hook loosely positioned thereon and longitudinally adjustable with respect to the trailing hook on said line.

FIG. 2 is a similar view with a coil spring mounted upon and surrounding the auxiliary hook.

FIG. 3 is a similar view of a finished assembly with the line or leader wrapped several times snugly around the coil spring and shank of the auxiliary hook and with a bait shown in dash lines suspended between the pair of hooks shown.

It will be understood that the above drawing illustrates merely a preferred embodiment of the invention and that other embodiments are contemplated within the scope of the claims hereafter set forth.

DETAILED DESCRIPTION OF AN EMBODIMENT OF THE INVENTION

Referring to the drawings, FIGS. 1, 2 and 3 there is shown progressively the formation of the present adjustable snelled hook assembly using one or more adjustable hooks in conjunction with a fixed hook on the end of a line or leader enabling the hooks to adjust to fit any size bait and adapted for fish striking changes. The present adjustable snelled hook assembly 11 is shown in FIG. 3. In the initial assembly, FIG. 1, the leader or line 13 having a loop 15 on one end is adapted for connection to fishing line 17, fragmentarily shown and knotted thereon as at 19 or otherwise secured thereto.

Trailing hook 21 having an eye 23 is mounted over the end of the leader 13 and suitably secured thereto in a conventional manner or otherwise tied thereon.

The present adjustable snelled hook assembly includes the free sliding auxiliary hook 25 initially slidably positioned upon the leader 13 in FIG. 1 and capable of adjustable positioning relative to the trailing hook 21.

The free sliding auxiliary hook 25 has a corresponding eye 23, a shank 27 and a barb 29. The eye 23 of the auxiliary hook 25 is loosely positioned over the leader 13 or equivalent line. In the second step of completing of the present adjustable snelled hook assembly a coil spring 31 or similar spiral flexible element is loosely positioned over and around the shank 27 of the auxiliary hook 25. The internal diameter of the coil spring 31 is less than the transverse dimension of the barb 29 to prevent accidental disengagement of the coil spring from said hook.

As shown in FIG. 3 with the shank 27 positioned closely adjacent and parallel to leader 13 a plurality of leader or line windings 33 extend snugly around spring 31 and adjacent shank 27 for fixedly anchoring the auxiliary hook 25 in a predetermined spaced relation with respect to trailing hook 21. In the illustrative embodiment the leader windings are approximately 3 to 6 windings for effectively anchoring the auxiliary hook in position along the length of the leader 13.

It is contemplated as equivalent construction that the leader 13 can be placed directly by the line 17 so that the trailing hook 21 would be mounted at one end of the line or an end portion of the line and the auxiliary hook 25 adjustably mounted upon such line spaced from trailing hook 21.

In the illustrative embodiment, FIG. 3, with the auxiliary hook 25 adjustably spaced from the trailing hook 21 there is impaled upon the respective hooks the worm 35 or other bait, natural or artificial, which extends between the respective hooks 21 and 25 to provide an attractive and efficient bait for the present adjustable snelled hook assembly.

In the illustrative embodiment the auxiliary hook 25 is adjustably mounted upon and along the length of the leader 13 and secured thereto by the windings 33. It is contemplated that instead of the leader 13 the auxiliary hook 25 could be mounted directly upon line 17 as would also the trailing hook 21 connected to an end portion thereof as at 23, FIG. 3.

It is contemplated as a part of the present invention that there could be a second auxiliary hook 37 adjustably mounted upon the leader 13 or line 17 with the auxiliary hook 37 having a corresponding eye 23, shank 27 and barb 29 and wherein the second auxiliary hook 37 is adjustably positioned upon leader 13 and retained in position by a plurality of windings 33 of the leader 13 around the spring 31 and adjacent shank 27.

In accordance with the present invention, the auxiliary hook 25 and additionally the secondary auxiliary hook 37 may be secured at any desired distance from the trailing hook 21. By merely unwinding the windings 33 of the leader 13 or in some instances the line 17 if the auxiliary hook is mounted directly upon the line, the auxiliary hook may be again adjusted along the length thereof and resecured by rewinding several windings of the leader or line 13 snugly around the spring 33 and adjacent shank 27 for efficiently and effectively anchoring the auxiliary hook 25 upon said leader or line.

The leader 13 is usually of a flexible material such as a nylon or equivalent plastic material and the line 17, fragmentarily shown, in FIG. 3 is of a conventional construction.

Having described my invention, reference should now be had to the following claims.

I claim:

1. An adjustable snelled hook assembly comprising an elongated flexible leader adapted for connection to a fishing line;
   a hook having a shank, an eye and a barb, with the eye loosely and slidably mounted upon leader;
   a coiled spring loosely surrounding and mounted upon said shank;
   said shank being generally parallel to and closely adjacent said leader; and
   a plurality of continuous windings of said leader intermediate its ends extending around and snugly engaging said spring and shank for adjustably securing said hook upon said leader.

2. In the adjustable snelled hook assembly of claim 1, said coil spring having an internal diameter less than said barb to prevent accidental separation of said spring therefrom.

3. An adjustable snelled hook assembly comprising an elongated flexible leader adapted for connection at one end to a fishing line;
   a trailing barbed hook having an eye secured to the other end of the leader;
   an auxiliary adjustable hook having a shank, an eye and a barb, with the eye loosely and slidably mounted upon the leader adjustably spaced from said trailing hook;
   a coil spring loosely surrounding and mounted upon said shank;
   said shank being generally parallel to and closely adjacent said leader; and
   a plurality of continuous windings of said leader intermediate its ends snugly engaging and extending around said spring a shank, for adjustably securing said auxiliary hook along the length of said leader to selectively fit any size bait impaled between said hooks.

4. In the adjustable snelled hook assembly to claim 3, said coiled spring having an internal diameter less than said barb to prevent accidental separation of said spring therefrom.

5. In the adjustable snelled hook assembly of claim 3, a second auxiliary adjustable hook with its eye loosely and slidably mounted upon the leader, adjustably spaced from said first auxiliary hook;
   a second coil spring loosely surrounding and mounted upon its shank;
   said latter shank being generally parallel and closely adjacent said leader; and
   a plurality of second continuous windings of said leader intermediate its ends extending around and snugly engaging said spring and shank, for adjustably securing said second auxiliary hook upon said leader.

6. An adjustable snelled hook assembly comprising a fisihing line;
   a trailing barbed hook having an eye secured to said fishing line;
   an auxiliary adjustable hook having a shank, an eye and a barb, with the eye loosely and slidably mounted upon the fishing line adjustably spaced from said trailing hook;
   a coil spring loosely surrounding and mounted upon said shank, said shank being generally parallel to and closely adjacent said fishing line; and
   a plurality of continuous windings of said line intermediate its ends extending around and snugly engaging said spring and shank for adjustably securing said auxiliary hook upon said line.

* * * * *